(12) United States Patent
Gierer et al.

(10) Patent No.: US 8,033,106 B2
(45) Date of Patent: Oct. 11, 2011

(54) ELECTROHYDRAULIC TRANSMISSION CONTROLLER, TRANSMISSION DEVICE, AND A MOTOR VEHICLE DRIVE TRAIN

(75) Inventors: Georg Gierer, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 589 days.

(21) Appl. No.: 12/257,528

(22) Filed: Oct. 24, 2008

(65) Prior Publication Data

US 2009/0107136 A1 Apr. 30, 2009

(30) Foreign Application Priority Data

Oct. 24, 2007 (DE) .................. 10 2007 050 802

(51) Int. Cl.
*F16H 61/12* (2010.01)
*F16H 61/22* (2006.01)
(52) U.S. Cl. ........................... 60/456; 475/120
(58) Field of Classification Search ............... 60/456, 60/459; 475/161, 20
See application file for complete search history.

(56) References Cited

U.S. PATENT DOCUMENTS

| | | | |
|---|---|---|---|
| 6,527,670 B1 | 3/2003 | Gierer et al. | |
| 7,243,767 B2 * | 7/2007 | Gierer et al. | 192/3.3 |
| 7,320,657 B2 | 1/2008 | Nozaki et al. | |
| 7,517,296 B2 * | 4/2009 | Foster et al. | 475/161 |
| 7,794,349 B2 * | 9/2010 | Gierer et al. | 475/119 |
| 2007/0015624 A1 | 1/2007 | Ota et al. | |

FOREIGN PATENT DOCUMENTS

| | | |
|---|---|---|
| DE | 3937939 A1 | 6/1990 |
| DE | 41 19 891 A1 | 1/1993 |
| DE | 198 58 543 A1 | 6/2000 |
| DE | 10 2004 027 115 A1 | 12/2005 |
| DE | 10 2005 036 565 A1 | 3/2006 |
| DE | 10 2005 012 586 A1 | 9/2006 |
| DE | 10 2006 019 096 A1 | 11/2006 |
| DE | 10 2006 000 334 A1 | 1/2007 |
| DE | 10 2006 014 947 A1 | 10/2007 |
| EP | 15 89 262 A1 | 10/2005 |
| WO | WO 2006097209 A1 * | 9/2006 |

* cited by examiner

*Primary Examiner* — Thomas E Lazo
(74) *Attorney, Agent, or Firm* — Davis & Bujold, P.L.L.C.

(57) ABSTRACT

An electrohydraulic transmission controller (7), a transmission device with an electrohydraulic transmission controller and a vehicle drive train that features an electrohydraulic transmission controller are disclosed. The electrohydraulic transmission controller is constructed with a plurality of electrically actuatable pressure control valves (9 to 16), as well as with a plurality of valve arrangements (17 to 34) that can be acted on in each case by an hydraulic precontrol pressure depending upon the actuation of the pressure valves, by way of which valve arrangements switching elements (A to E) of a transmission device can be acted on in each case with a control pressure to produce a required operating state of the transmission device. An additional pressure control valve (9) is provided to adjust a precontrol pressure (p_VS_9) of an additional valve arrangement (35), whereby downstream of the additional valve arrangement, the sub-assembly (6) of a vehicle drive train can be acted on by a cooling oil volume flow subject to the precontrol pressure of the additional valve arrangement and an operating state of the additional valve arrangement (35) corresponding to it.

23 Claims, 6 Drawing Sheets

ELECTROHYDRAULIC TRANSMISSION CONTROLLER, TRANSMISSION DEVICE, AND A MOTOR VEHICLE DRIVE TRAIN

This application claims priority from German Application Serial No. 10 2007 050 802.8 filed Oct. 24, 2007.

FIELD OF THE INVENTION

The invention relates to an electrohydraulic transmission controller with a plurality of electrically controlled pressure control valves, a transmission device of a motor vehicle drive train, as well as a vehicle drive train with a transmission device featuring an electrohydraulic transmission controller.

BACKGROUND OF THE INVENTION

In the motor vehicle drive trains known from the state of the art, which are equipped respectively with an internal combustion engine, a transmission device and an output. The component assemblies thereof are subjected to stresses depending on operating state. These stresses result from the greater frictional stresses on switching elements that are periodically operated in a slipping state during startup procedures or switching operations in the transmission device.

In order to reduce fuel consumption and pollutant emissions, motor vehicles are increasingly equipped with hybrid drives. In motor vehicles, systems are provided with both parallel and serial arrangement of the two drive systems, that is, the internal combustion engine and the electric engine.

When there is parallel arrangement of the two drive systems, a vehicle can be operated by both drives independent of each other, where an internal combustion engine can be separated from an electric engine by way of a decoupler and the latter, in turn, uncoupled by way of an additional friction-locked switching element an additional decoupler.

A transmission device is, in each case, connected to an output of a vehicle drive train, where with an engaged switching element that is arranged between the internal combustion engine and the electric engine and with an engaged switching element that is provided between the electric engine and the transmission device, a vehicle can be driven by the internal combustion engine alone or in combination with the electric machine engine. By engaging only the switching element that is arranged between the electric engine and the transmission device, a vehicle can be driven soley by the electric engine or by braking energy that is recuperable via the electric engine, which is then driven by a generator.

The previously described hybrid systems are used in connection with automated transmissions and in combination with automatic transmissions. Particularly in the case of use in automatic transmissions, a switching element of the automatic transmission is ideally located between the electric engine and the transmission device. A torque converter, provided as a startup device for internal combustion engine startup procedures is, in hybrid drives, often replaced by the switching element arranged between the internal combustion engine and the electric engine or between the electric engine and the transmission device.

The different assemblies in hybrid motor vehicle drive trains are subjected to considerable thermal stresses during critical operating states because, particularly the switching elements between the internal combustion and electric engines and the transmission device must be transferred in a slipping state with high rotational speed differences and with high torque applying to them at the same time into an engaged operating state. This is the case when a vehicle, due to a low charge condition of electrical storage units assigned to the electric engine, has to be started using the internal combustion engine or a clutch configured as a switching element for vibrationally disengaging the internal combustion engine, has to be operated in a slipping state.

In order to reduce the high thermal stresses occurring in the previously described switching elements, the switching elements are usually wet multi-plate clutches of disc brakes, which are cooled by a cooling oil volume flow. In order to adjust the cooling of the switching element to the changing requirements during different operating states of a vehicle drive train, there is an attempt to vary the coolant volume flow that is supposed to be supplied to the switching elements at any given time by way of a predefined strategy subject to operating state.

There is no satisfactory representation capacity with conventional hydraulic systems with electrohydraulic transmission controllers of strategy-compatible cooling systems, of switching elements of drive trains or hybrid drive trains of motor vehicles, as known from DE 198 58 543 A1 or from DE 10 2005 012 586 A1.

This results from the fact that in order to adequately cool the switching elements that are under great thermal stress, in addition to the hydraulic transmission systems, there must also be hydraulic cooling systems with their own coolant circulation and their own coolant pump, which exhibit complex construction, require a large installation space and have a high dead weight, and which are also characterized by a great control and regulation complexity which, among other things, results in high cost.

The present invention is therefore based on the task of providing an electrohydraulic transmission control, a transmission device and a motor vehicle, which reduce thermal stresses on assemblies of a motor vehicle drive train over the entire operating range of a motor vehicle drive train in a simple and cost-effective way.

This task is performed with an inventive electrohydraulic transmission controller and transmission device of a motor vehicle drive train or with a vehicle drive train.

SUMMARY OF THE INVENTION

The electrohydraulic transmission controller of the invention includes with a plurality of electrically actuatable pressure control valves and a plurality of valve arrangements that can be acted on respectively by a hydraulic control pressure subject to the control of the pressure valves. These valve arrangements actuate the switching elements of a transmission device with the control pressure necessary, in any given instance, to implement a requested operating state of the transmission device.

In accordance with the invention, an additional pressure control valve adjusts the control pressure of an additional valve arrangement where, downstream from the additional valve arrangement, a sub-assembly of a motor vehicle drive train can be acted on by a cooling oil volume flow that is subject to the control pressure of the additional valve arrangement and an operating state of the additional valve arrangement that corresponds to it.

The electrohydraulic transmission controller of the invention represents a combination of a conventional transmission controller and a cooling oil system known from the state of the art, such that the thermal stress on a sub-assembly of a motor vehicle drive train can be reduced in a strategy-compatible manner. In contrast to the solutions known from the state of the art, with the electrohydraulic transmission control of the invention, thermal stress on a sub-assembly of a motor vehicle drive train can be more simply and cost-effectively reduced, because the cooling of a sub-assembly of a motor vehicle drive train that is under thermal stress can be carried out in a strategy-compatible manner, compared to a transmission controller known from the state of the art, with a transmission controller that is only marginally modified, without additional cooling devices. In addition, the idea of the invention can also be integrated into existing systems in a particularly simple manner and without elaborate constructive measures, and with minimal control and regulation complexity.

In addition to the conventional functions for representing different operating states of a transmission device, the electrohydraulic transmission controller of the invention is also configured with strategy-compatible actuating elements that can be integrated into an electrohydraulic transmission device with marginal requirements for constructive, commercial and functional implementation. This is achieved by way of an electric control element of the strategy-compatible actuator that can be operated as far as possible, independently of other functions in a transmission device. In this manner, existing hydraulic switching devices or electrohydraulic transmission controllers, which are provided for controlling and for operating automatic transmissions, can be modified in such a way that hydraulic cooling of a sub-assembly of a motor vehicle drive train can be implemented, in each case with as few constructive changes to the actuator elements, as possible, throughout almost the entire operating range of a motor vehicle drive train.

With the transmission device of the inventive motor vehicle drive train and electrohydraulic transmission controller and with a transmission housing, the sub-assembly includes a frictionally engaged switching element, arranged inside the housing, which can be cooled on by the cooling oil volume flow.

In this way, the transmission device of the invention combines the advantages of the electrohydraulic transmission controller with the advantage that, for reducing the thermal stress of the sub-assembly of a motor vehicle power train, the coolant circulation of the sub-assembly can be integrated in a simple way into the hydraulic circulation of the transmission device and the strategy-compatible cooling can consequently be implemented more economically.

The motor vehicle power train of the invention is constructed with a transmission device and includes a hydraulic transmission controller with an internal combustion motor, an output, and a sub-assembly with a frictionally engaged element which can be acted upon by the coolant volume flow.

With the motor vehicle drive train constructed in accordance with the invention, the thermal stress of a sub-assembly drive of a motor vehicle drive train can be reduced in a simple and cost-effective way. A cooling system of the sub-assembly that is preferably arranged externally to a transmission device is integrated into an electrohydraulic transmission controller of the transmission device in order to carry out cooling of the sub-assembly in a simple and cost-efficient manner. In addition, the motor vehicle drive train of the invention, in contrast to drive trains known from the state of the art, in which a sub-assembly configured with a switching element can be cooled in a strategy-compatible manner, can be manufactured in a more cost-efficient way and is characterized by less need for installation space and lower total weight.

BRIEF DESCRIPTION OF THE DRAWINGS

The invention will now be described, by way of example, with reference to the accompanying drawings in which in the interest of facility of inspection of the different embodiments, the same reference numerals are used for components that are identical in construction and have the same function. The following is shown.

DETAILED DESCRIPTION OF THE INVENTION

Figure 1:
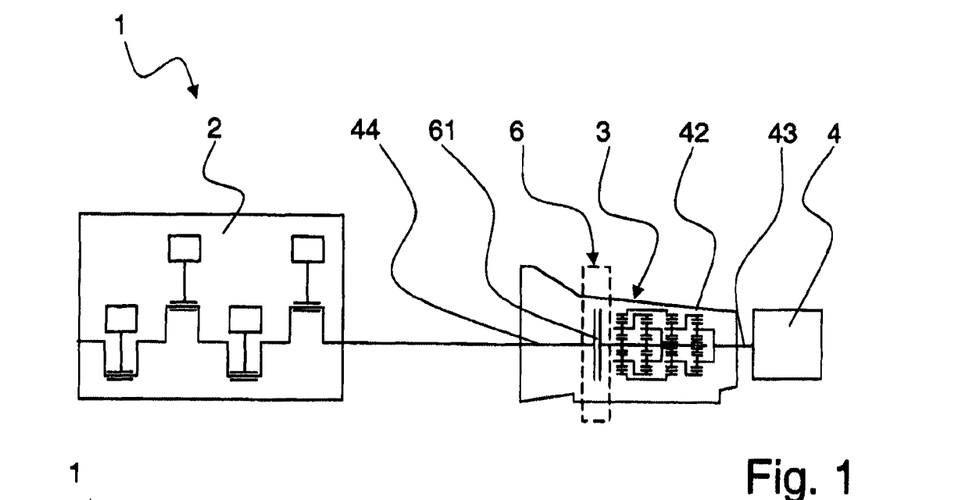
FIG. 1 is a highly schematic representation of a motor vehicle drive train with an internal combustion engine, a transmission device and an output, where the transmission device comprises a sub-assembly of the motor vehicle drive train that features an integrated starting element.
Figure 2:
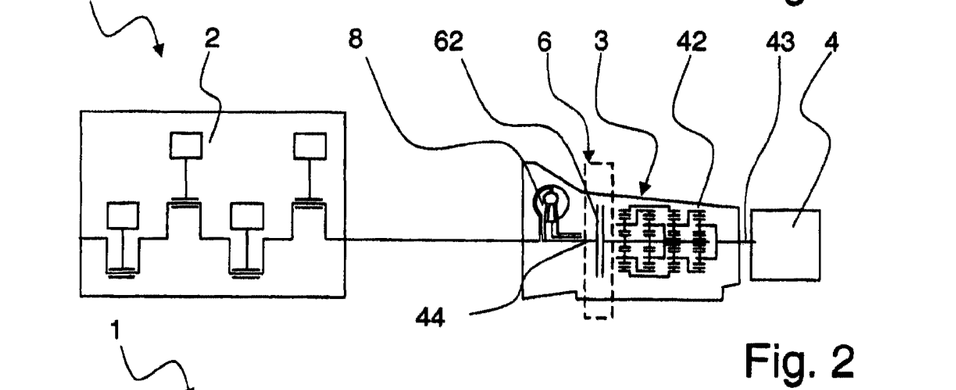
FIG. 2 is a further development of the motor vehicle drive train shown in FIG. 1 in which a hydrodynamic torque converter is arranged on the transmission input side.
Figure 3:
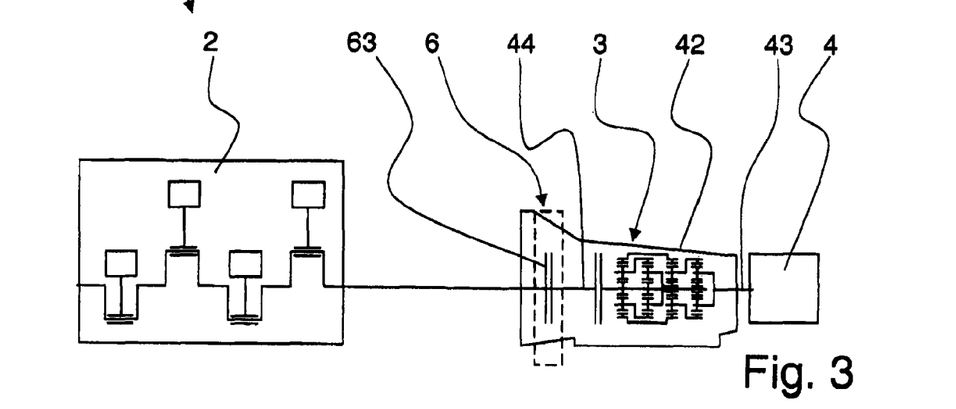
FIG. 3 is a third embodiment of a motor vehicle drive train that is configured between the internal combustion engine and the transmission device with a sub-assembly featuring a frictionally engaged switching element.

In FIG. 1 to FIG. 3, a plurality of embodiments are represented of a vehicle drive train 1 of a motor vehicle with an internal combustion engine 2, a transmission device 3, and an output 4. The vehicle drive trains according to FIG. 4 to FIG. 6 in addition to the previously cited main groups, are additionally configured in the area between the internal combustion engine 2 and the transmission device 3, with an electric engine 5 and, in each case, represent a parallel hybrid drive chain of a motor vehicle.

In addition, the vehicle drive trains 1 according to FIG. 1 to FIG. 6, in each case, are constructed with a sub-assembly 6, which is arranged inside or outside a transmission housing 42 and which, subject to the existing operating state at any given time of the vehicle drive train 1, can be acted on by way of a valve arrangement of an electrohydraulic transmission controller, shown in FIG. 7, FIG. 8 or FIG. 9, in a strategy-compatible manner, in the manner as described below, by a cooling oil volume flow.

In each case the sub-assembly 6 comprises frictionally engaged switching elements 61, 62, 63, 64, 65 or 66, which can be cooled in a strategy-compatible manner by way of an electrohydraulic transmission controller 7. The switching element 61 of the vehicle drive train 1, according to FIG. 1, functions as the starting element and is integrated into the transmission device 3, which is, at the same time, a switching element of the transmission device 3 and which is switched on or off to implement transmission ratios in the transmission device 3.

The switching element 62 of the sub-assembly 6 of the vehicle drive train 1, according to FIG. 2, is arranged between a starting element that is configured as a hydrodynamic torque converter 8 and an area of the transmission device 3, such that a required transmission ratio, subject to the operating state of the transmission device 3, is adjusted at any given time. The switching element 62 is operated in a slipping state during starting procedures to bring the internal combustion engine 2 initially up to a speed that is favorable for the startup procedure and then, in order to conduct the torque that is both produced by the internal combustion engine 2 and converted with the hydrodynamic torque converter subject to converter recognition increasingly in the direction of the output 4. In that way, a starting weakness of an internal combustion engine 2, which can be configured as a turbo internal combustion engine or as a diesel internal combustion engine, is avoided in a simple manner.

The sub-assembly 6 of the vehicle drive train 1, according to FIG. 3, is constructed with a friction-locked switching element 63, which constitutes an external decoupler, such that the internal combustion engine 2 on the transmission input side of the transmission device 3, can be decoupled, depending on the operating states of the drive train 1 existing at any given time, and by way of which a startup procedure using the internal combustion engine can be carried out by a motor vehicle equipped with the drive train 1, according to FIG. 3, in the inherently known manner.

Figure 4:
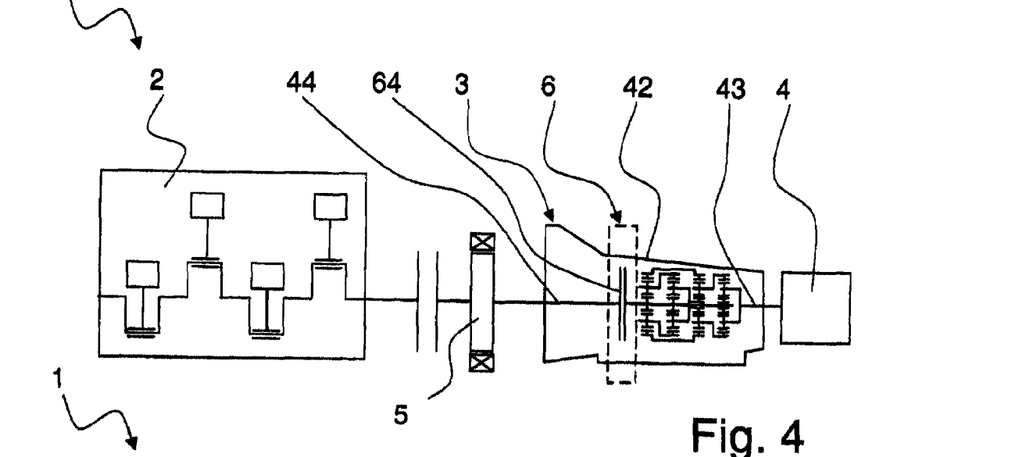
FIG. 4 is a motor vehicle drive train that is configured as a hybrid drive train with an electric engine arranged between the internal combustion engine and the transmission sub-assembly in which a starting element, integrated into the transmission device, can be cooled on by a cooling oil volume flow that can be adjusted in a strategy-competent manner.

The switching element 64 of the sub-assembly 6 of the drive train 1, according to FIG. 4, essentially corresponds to the switching element 61 of the sub-assembly 6, according to FIG. 1, such that a startup procedure can be realized by the internal combustion engine of a motor vehicle, where the electric engine 5 can be placed in functional connection with a transmission output shaft 43 by way of the switching element 61.

Figure 5:
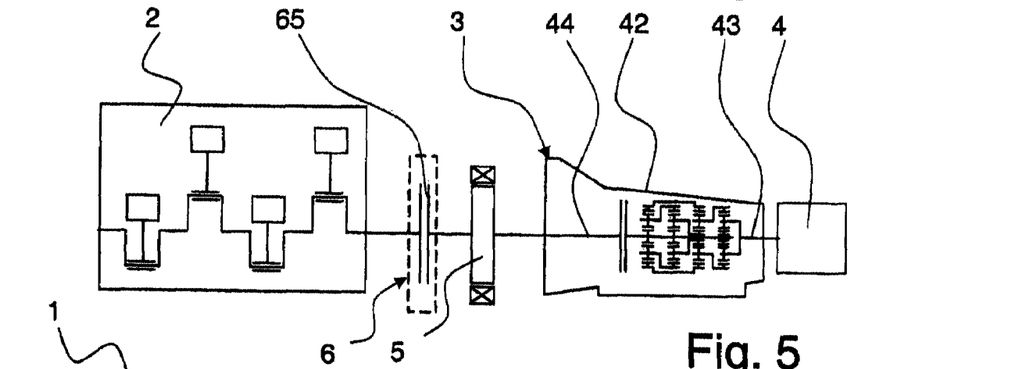
FIG. 5 is a motor vehicle drive train according to FIG. 4, and a frictionally-locking switching element of a sub-assembly that can be acted on by a cooling oil volume flow that is adjusted in a strategy-compatible manner.
Figure 7:
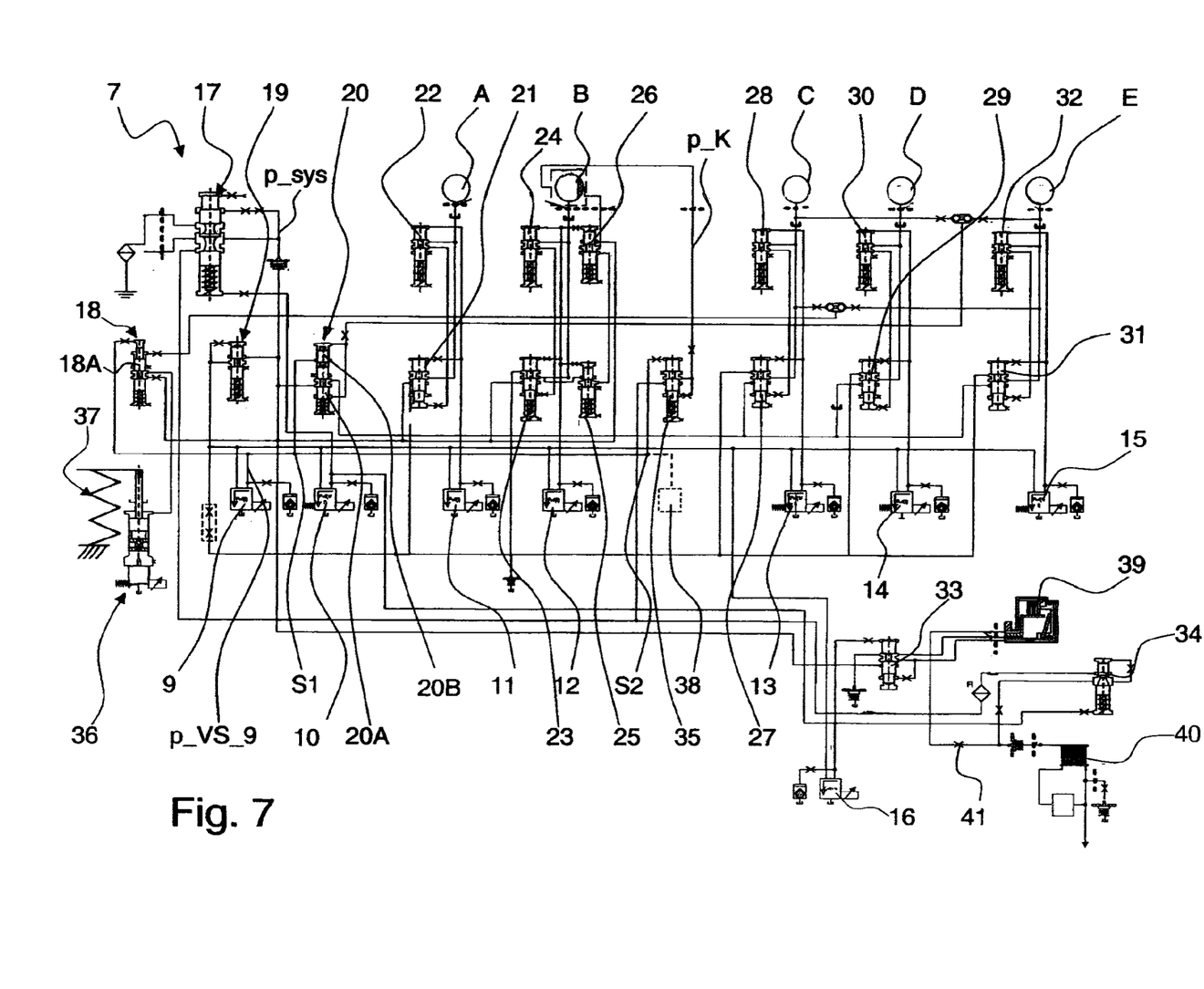
FIG. 7 is a hydraulic circuit diagram represented in a simplified manner of the electrohydraulic transmission controller of the invention with an electric selector lever.
Figure 8:
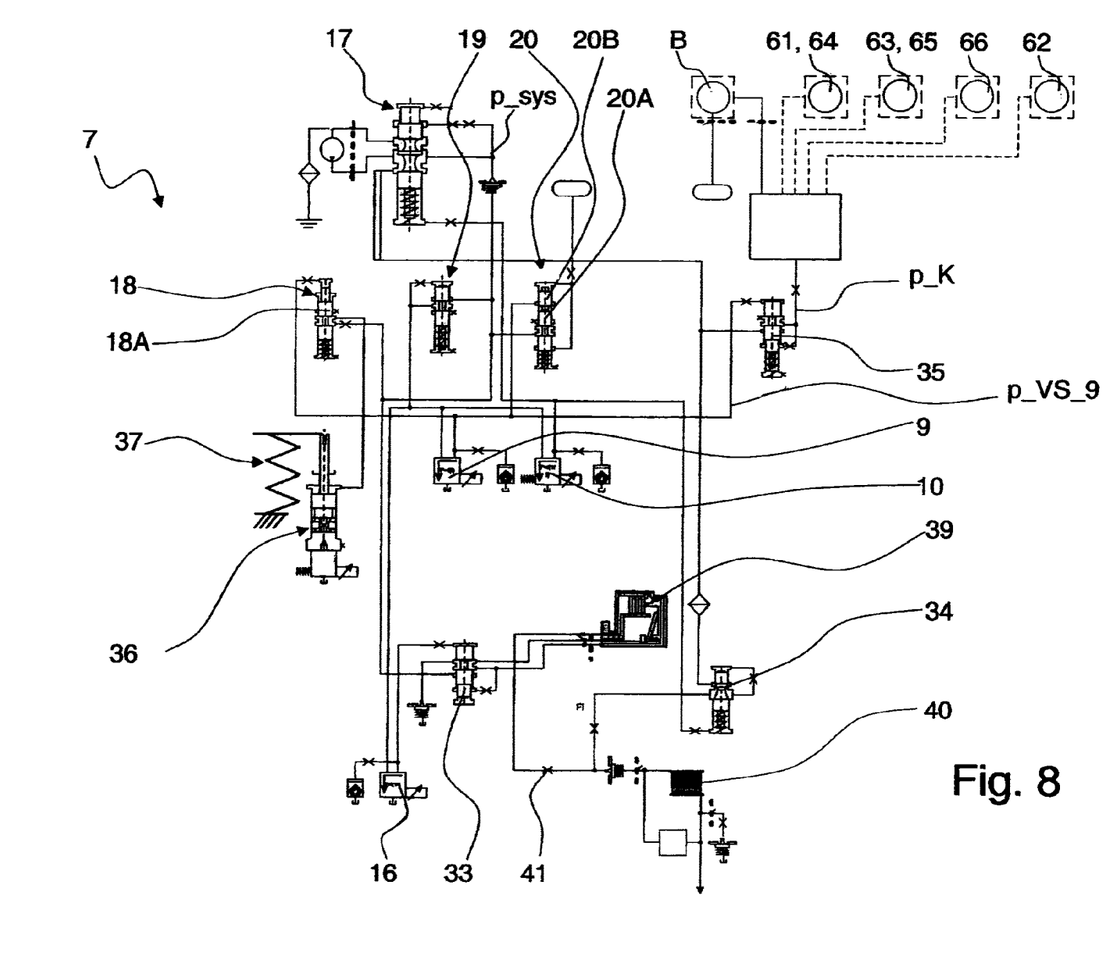
FIG. 8 is a hydraulic circuit diagram, according to FIG. 7 in a further simplified representation.
Figure 9:
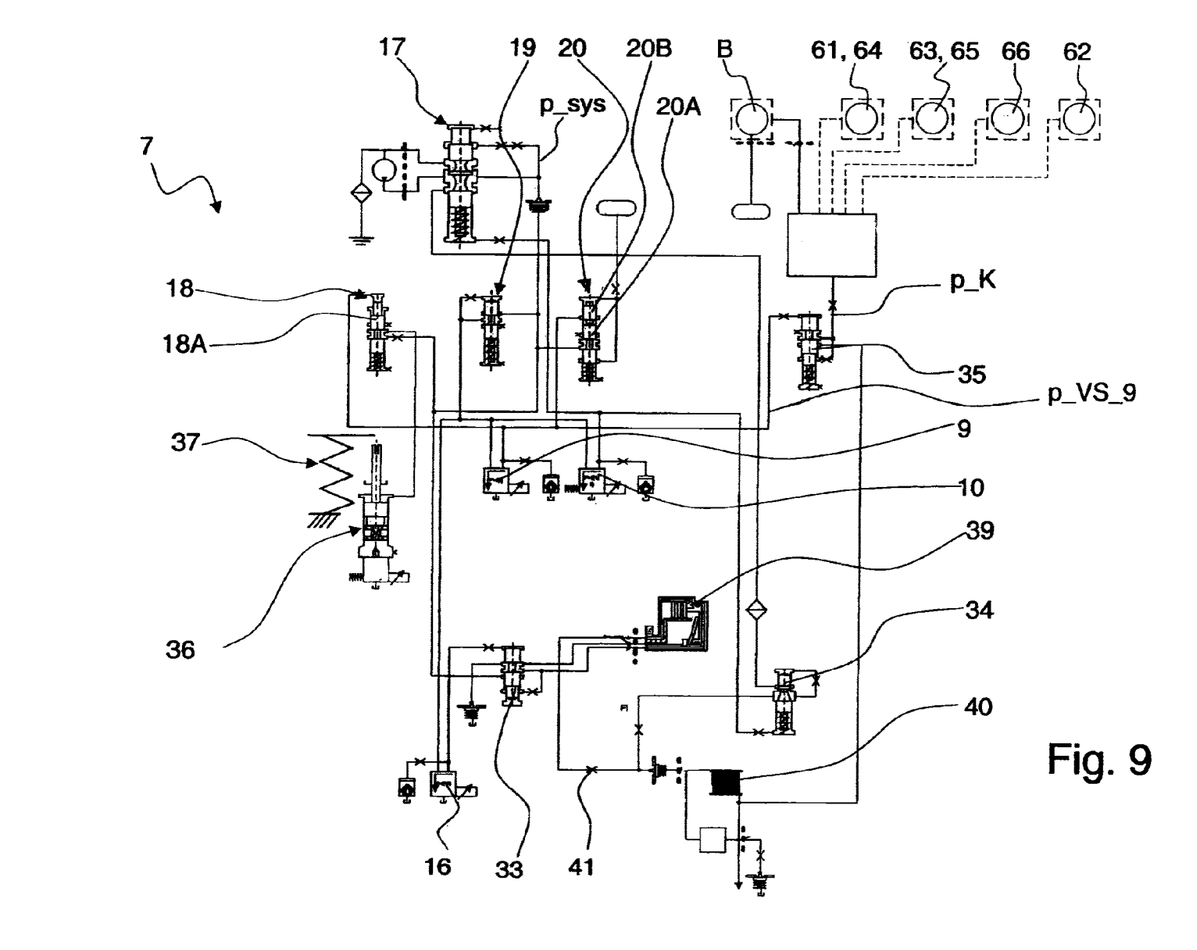
FIG. 9 is a representation corresponding to FIG. 8 of a hydraulic circuit diagram of a second embodiment of the electrohydraulic transmission control of the invention in which the cooling oil volume flow can be directed upstream of the sub-assembly that is to be cooled in a strategy-compatible manner via a cooler.

In the case of the vehicle drive train 1 according to FIG. 5, the sub-assembly 6 is arranged between the internal combustion engine 2 and the electric machine 5 so that a switching element 65 of the sub-assembly 6, which constitutes a decoupler for decoupling the internal combustion engine 2 from the electric engine, can be cooled by way of one of the embodiments of the electrohydraulic transmission controller 7 according to FIG. 7 to FIG. 9.

Figure 6:
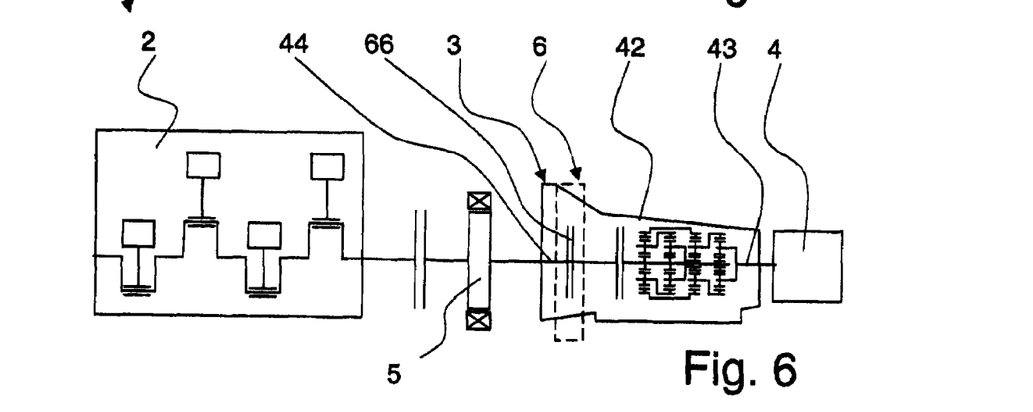
FIG. 6 is a further development of the motor vehicle drive train shown in FIG. 4 and FIG. 5 in which a frictionally-locking switching element of a sub-assembly arranged, between the electric engine and the transmission device can be cooled in a strategy-compatible manner.

The vehicle drive train 1 according to FIG. 6 is different from the vehicle drive train 1, according to FIG. 5, in that the sub-assembly 6 with its switching element 66, between the electric engine 5 and the output 4, is arranged in the area of the transmission input of the transmission input 3. In this way, the switching element 66 constitutes an external decoupler, such that the transmission ratios in the transmission devices 3 can be produced, between the electric engine 5 and the transmission device 3, in order to establish or disconnect a functional connection between the electric engine 5 and the output 4 of a transmission output shaft 44, or the transmission device 3 in this area.

The switching elements of the sub-assembly 6, which are provided as decouplers between the electric engine and the output of the vehicle drive train 1, can be arranged on both the transmission input side and the transmission output side in order to establish or interrupt a power flow between the output and the electric engine.

Furthermore, there is the possibility of providing the frictionally engaged switching element of the sub-assembly with a hydrodynamic torque converter for the purpose of bridging a hydraulic coupling device.

Several desired operating states of the transmission device 3 can be implemented by way of the electrohydraulic transmission controller 7, shown in FIG. 7, which works together with an electric selector lever. Furthermore, by way of the transmission controller 7, the different assemblies 6 of the vehicle drive trains 1, according to FIG. 1 to FIG. 6, can be acted on in the manner described below, by a coolant volume flow that varies depending on a current operating state of a vehicle drive train 1.

For this purpose, the transmission controller 7 includes several electrically actuatable pressure control valves 9 to 16, as well as a plurality of valve arrangements 17 to 34, which are acted on with an hydraulic control pressure, subject to actuation of the pressure control valves 9 to 16, in order to act on switching elements A to E of the transmission device 3 with the precontrol pressure necessary to implement a required operating state of the transmission device 3.

Furthermore, using the pressure control valve 9, a precontrol pressure p_VS_9 of an additional valve arrangement 35 can be adjusted in order to have a cooling oil volume flow that is dependent upon the precontrol pressure p_VS_9 of the additional valve arrangement 35 and an operating state of the transmission corresponding to it of the additional valve arrangement 35, act on the assemblies 6 of the vehicle drive train 1, according to FIG. 1 to FIG. 6, which are arranged downstream of the additional valve arrangement 35.

In the additional description of FIG. 7, the mode of operation of the transmission controller 7 is explained in more detail in connection with the configuration of the vehicle drive train 1, according to FIG. 4, where the mode of operation of the transmission 7 in connection with the configurations of the vehicle drive trains according to FIG. 1 to FIG. 3, as well as according to FIG. 5 and FIG. 6, essentially corresponds to the mode of operation described below.

The switching element B of the transmission controller 7, which is configured as a frictionally-engaged clutch, has the same mode of functioning and is positioned at the same place in a vehicle drive train as the switching element 64 of the sub-assembly 6 of the drive train 1, according to FIG. 4, by way of which an internal-combustion engine startup procedure can be performed in the essentially known way, which is why below, reference is made only to the switching element B.

To remove the heat that is produced during an internal combustion engine startup procedure in the area of the clutch B, which is operated initially in a slipping state, and reduce the thermal stress to the desired extent, the additional valve arrangement 35 is supplied by the pressure control valve 9 with such a precontrol pressure p_VS_9 that the switching element B is then supplied with the necessary cooling oil volume flow by the valve arrangement 35, referred to below as a cooling valve.

By way of the electrohydraulic transmission controller 7, subject to the embodiment of the transmission device 3 of the vehicle drive train 1, according to FIG. 1 to FIG. 6, six to eight forward gears can be produced, one reverse gear, one neutral transmission state in which no torque can be transferred, via the transmission device 3, and one parking operational state in which the drive 4 is held in a rotationally fixed manner. The driver of a motor vehicle, during operation of a motor vehicle configured with the vehicle drive train 1, expresses a driver request via an electric selector lever, which transforms the driver's request into a corresponding electric signal which, in turn, is hydraulically transformed by way of the corresponding operational routines in the electrohydraulic transmission controller 7.

In order to implement the driver's request, selected with a gearshift, the electrohydraulic transmission controller 7 is configured with a valve arrangement 20, which is referred to below as a position valve, and has a driving direction request storage function with a main piston 20A and a supplementary piston 20B, which for this purpose are subjected to precontrol pressures, depending on the operating state, by different hydraulic switches.

The storage function of the position valve 20 is also produced by an engaged driving gear so that in order to store the driving direction request in the area of the position valve 20, hydraulic actuation of the position valve 20 does not necessarily have to be implemented by the pressure valve 9.

A parking lock (not described in more detail) is hydraulically disengaged by way of an hydraulic cylinder 36 and mechanically engaged by way of a spring arrangement 37. The hydraulic pressure that acts on the hydraulic cylinder 36 is fed via the valve arrangement 18, which is referred to below as a parking lock valve, from a system pressure p_sys. Precontrol pressure P_VS_9 is, in turn, applied to the parking lock valve 18 by the pressure control valve 9, whereby precontrol pressure p_VS_9 is applied to the parking lock valve 18 and the position valve 20, as well as to the cooling valve 35, by pressure control valve 9.

Due to the fact that the parking lock valve 18, the position valve 20 and the cooling valve 35 are actuated by the electrohydraulic pressure control valve 9 and have different valve characteristics, continuous actuation of the precontrol pressure p_VS_9 for the three valve arrangements 18, 20, and 35 is possible by way of proportional electric current. The pressure control valve 9 displays a continuous pressure range, which preferably lies between 0 and 5 bar. In that way, actuating the valve arrangements 18, 20 and 35, which are arranged downstream from the pressure control valve 9, in rotation to their areas of application is possible.

The position valve 20 reroutes pressure above a first pressure limit of preferably 0.8 bar and the system pressure p_sys is then switched in the area of the position valve 20. At a second pressure limit of preferably 2 bar, the parking lock valve 18 redirects the pressure and the parking lock is released. Above a third pressure limit of preferably 2.5 bar and up to an upper pressure limit of approximately 5 bar of the continuous pressure range of the pressure control valve 9, there is continuous actuation of the cooling valve 35. The switching element B that is to be cooled or the startup element B is provided, in a strategy-compatible manner in the way depicted in FIG. 10 via the precontrol pressure p_VS_9 of the pressure valve 9, with a varying cooling oil volume flow Q_K.

Because a maximum precontrol pressure p_VS_9 of 5 bar can be adjusted by way of the electrohydraulic pressure control valve 9, a cooling oil pressure p_K also does not rise above 5 bar downstream from the cooling valve 35. Furthermore, the cooling oil volume flow Q_K adjusted in the area of the cooling valve 35 also displays no linear dependency on the cooling oil pressure p_K, which is why the curve of the cooling oil volume flow Q_K, shown in FIG. 10, is parabolic.

Figure 10:
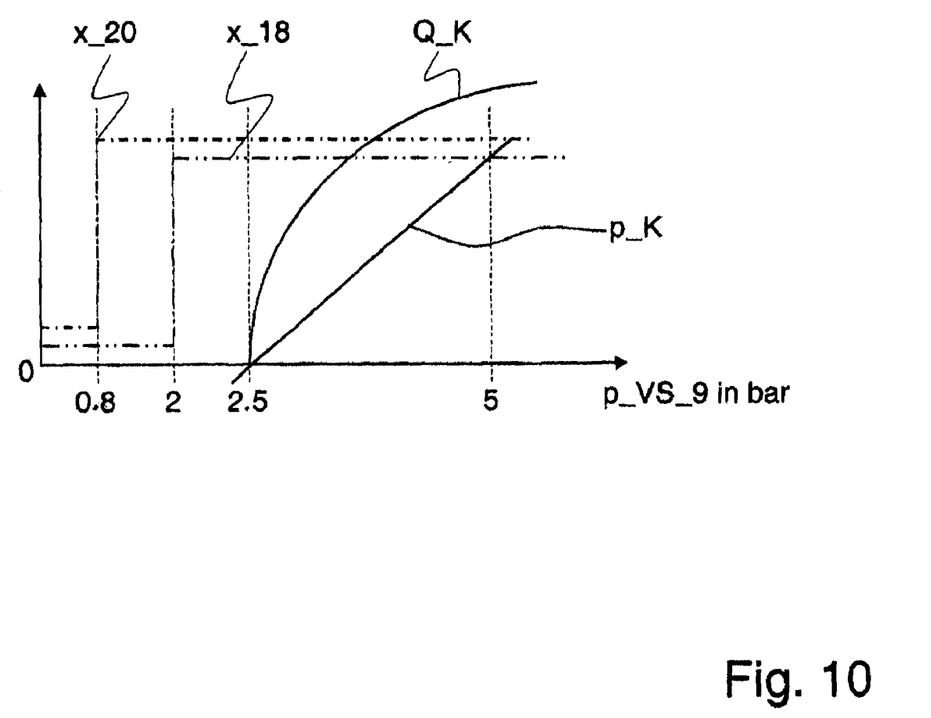
FIG. 10 is a plurality of progressions of different operating state parameters of the electrohydraulic transmission controller, according to FIG. 7, subject to the precontrol pressure adjusted using the additional pressure control valve.

In FIG. 10, in addition to the curve of the cooling oil pressure p_K downstream from the cooling valve 35, curves x_18 and x_20 of a valve slider 18A, or 20A and 20B of the parking lock valve 18 and the position valve 20 are also graphically represented. The illustration, according to FIG. 10, shows that the position valve 20 redirects pressure at the first pressure limit of 0.8 bar, while the parking lock valve 18 and the cooling valve 35 still show no change in operating state. When the second pressure limit of 2 bar is reached, the parking lock valve 18 redirects the pressure, while the cooling oil volume flow Q_K and the cooling oil pressure p_K are still zero. Above the third pressure limit of the precontrol pressure p_VS_9 of the additional pressure control valve 9 of 2.5 bar, the cooling oil is directed via the cooling valve 35 in the direction of the switching element B, and the cooling oil pressure p_K rises proportionally to the precontrol pressure p_VS_9 of the additional pressure control valve 9 up to the upper pressure limit of 5 bar.

The cooling valve 35 is therefore configured as a pressure-reducing valve when the pressure tapping takes place downstream from the cooling valve. Deviating from this, there is also the possibility of configuring the cooling valve 35 as a volume flow-regulating valve, whereby the cooling valve 35 is then hydraulically interconnected in a form different than that shown in FIG. 7.

Alternatively, however, there is also the possibility that the cooling valve 35, at a precontrol pressure p_VS_9 of the additional pressure control valve 9, is actively switched below the rerouting pressure of the parking lock valve 18. This means that the cooling valve 35 redirects the pressure and the cooling volume flow Q_K is routed in the direction of the starting element B, without the parking lock valve already being adjusted, whereby the parking lock is still engaged.

In the embodiment of the electrohydraulic transmission controller 7, shown in FIG. 7, the parking lock valve 18 is acted on by the operating pressure of the switching element C or the switching element E and is adjusted by correspondingly high-pressure values. This guarantees that the parking lock is released if the precontrol pressure p_VS_9 of the additional pressure control valve 9 does not display the required pressure value and, due to the current operating situation of the automatic transmission the transmission device 3, a release of the parking lock is required.

Furthermore, there is also the possibility of actuating the cooling valve 35 by way of an additional electric pressure actuator or an additional pressure control valve 38, which is shown by way of a dashed line in FIG. 7, and to separate it from the control of the parking lock valve 18 and the position valve 20. In that case, the connection between points S1 and S2, between the additional pressure control valve 9 and the cooling valve 35, is not required. Basically, the pressure control valve 9 can also be configured as a magnetic valve in the last-mentioned embodiment of the electrohydraulic transmission controller 7; this magnetic valve is more cost-efficient and can be operated with less control and regulation complexity than a pressure control valve.

Additionally, a frictionally engaged switching element 39 of the vehicle drive train 1, according to FIG. 4, that is arranged between the internal combustion engine 2 and the electric engine 5, is actuated subject to the operating state of the electrohydraulic transmission controller 7 by way of the valve arrangement 33, in order to enable operation of the vehicle drive train 1 with a coupled internal combustion engine 2 or with an uncoupled internal combustion engine 2, as well as enabling the starting of the switched-off internal combustion engine 2 by way of the electrical engine 5 in the conventional manner, through corresponding actuation of the switching element 39—without producing the corresponding reactive torque on the drive side.

FIG. 8 is a simplified representation of the hydraulic circuit diagram of the electrohydraulic transmission controller 7 according to FIG. 7 where, downstream from the cooling valve 35, the switching elements 61 to 66 of the sub-assembly 6, according to FIG. 1 to FIG. 6, are shown in each case as switching elements that are acted on, in the previously described manner via the cooling valve, by a strategy-compatible cooling oil volume flow.

In the case of the embodiment of the electrohydraulic transmission controller 7, shown in FIG. 9, the cooling oil volume flow that is supposed to be directed to each of the switching elements 61 to 66 is initially led upstream from the cooling valve 35, via a cooler 40, where the temperature of the hydraulic fluid volume flow provided for cooling the shifting elements 61 to 66 can be maintained upstream of the switching elements 61 to 66, and a cooling capacity can be simply adjusted downstream of the cooling valve 35.

In the embodiments of the electrohydraulic transmission controller 7 shown in the drawing, the switching element 39 is not configured as a starting element and is supplied with cooling oil, via a throttle, exclusively from a low-pressure area arranged downstream from a throttle 41. A strategy-compatible cooling of the switching element 39 is then, however, not possible as provided in the previously-described manner.

If the switching element 39 is also configured as a starting element, its mode of operation corresponds to the mode of operation of the switching element 65 of the sub-assembly 6 of the vehicle drive train 1, according to FIG. 5, where the switching element 39 is then integrated into the hydraulic system downstream of the cooling valve 35 in the same manner as the switching element 65 and can be supplied in a strategy-compatible manner with cooling oil. The cooling oil supply via the low-pressure area, as shown in the drawing, is then not required.

If the assemblies 6 of the vehicle drive trains 1, shown in the drawing, are integrated into the transmission housing or affixed to it respectively, the vehicle drive trains 1 are easy to assemble, whereby sub-assembly is made even simpler if the electric engines of the hybrid drive trains and the additional decouplers between the internal combustion machines and the electric machines or, between the electric machines and the outputs, form a constructional unit with the transmission devices, or form a module group with the latter.

If the transmission device of the invention is configured as a twin-clutch transmission, the switching element of the sub-assembly that can be acted on by a cooling oil volume flow that is varied in a strategy-compatible manner, is then one of the switching elements that is provided for switching on and off a power path of the twin-clutch transmission.

| Reference numerals | |
|---|---|
| 1 | vehicle drive train |
| 2 | internal combustion engine |
| 3 | transmission device |
| 4 | output |
| 5 | electric engine |
| 6 | sub-assembly |
| 7 | electrohydraulic transmission controller |
| 8 | hydrodynamic torque converter |
| 9 to 16 | pressure control valve |
| 17 | valve arrangement |
| 18 | valve arrangement, parking lock valve |
| 18A | valve slide |
| 19 | valve arrangement |
| 20 | valve arrangement, position valve |
| 20A | main piston |
| 20B | supplementary piston |
| 21 to 34 | valve arrangement |
| 35 | additional valve arrangement, cooling valve |
| 36 | hydraulic cylinder |
| 37 | spring arrangement |
| 38 | additional pressure actuator |
| 39 | switching element |
| 40 | cooler |
| 41 | throttle |
| 42 | transmission housing |
| 43 | transmission output shaft |
| 44 | transmission input shaft |
| 61 to 66 | switching element |
| A to E | switching element |
| p_K | cooling oil pressure |
| p_VS_9 | precontrol pressure |
| p_sys | system pressure |
| Q_K | cooling oil volume flow |
| S1, S2 | point |
| x_18, x_20 | valve slide position |

The invention claimed is:

1. An electrohydraulic transmission controller (7) comprising several electrically actuatable pressure control valves (9 to 16), a plurality of valve arrangements (17 to 34), each of which are controlled by a hydraulic pre-control pressure depending the activation of the pressure control valves (9 to 16), a plurality of switching elements (A, B, C, D, E) of a transmission device (3) are actuated by a control pressure for engaging an operating state of the transmission device (3), an additional pressure control valve (9) adjusts another pre-control pressure (p_VS_9) of an additional valve arrangement (35) such that, downstream of the additional valve arrangement (35), a sub-assembly (6) of a motor vehicle drive train (1) is acted on by a cooling oil volume flow that is subject to the other pre-control pressure (p_VS_9) of the additional valve arrangement (35) and an operating state of the additional valve arrangement (35) corresponding to it.

2. The electrohydraulic transmission controller according to claim 1, wherein the additional valve arrangement (35) is a pressure-variable pressure reduction valve.

3. The electrohydraulic transmission controller according to claim 1, wherein the additional valve arrangement (35) comprises a volume-flow regulation valve.

4. The electrohydraulic transmission controller according to claim 1, wherein a parking lock valve (18) interacts with an hydraulic cylinder (36) for actuating a parking lock.

5. The electrohydraulic transmission controller according to claim 1, wherein a position valve (20), which hydraulically implements an electrically pre-settable selector lever position of a selector lever, is actuated by a pressure control valve (9) with the other pre-control pressure (p_VS_9).

6. The electrohydraulic transmission controller according to claim 5, wherein the parking lock valve (18) and the position valve (20) are dedicated to a common pressure control valve (9).

7. The electrohydraulic transmission controller according to claim 5, wherein the parking lock valve (18) and the position valve (20) are actuated by the additional pressure control valve (9) with the other pre-control pressure (p_VS_9).

8. The electrohydraulic transmission controller according to claim 5, wherein the parking lock valve (18), the position valve (29) and the additional valve arrangement (35) each have different valve characteristics.

9. The electrohydraulic transmission controller according to claim 1, wherein the cooling oil volume flow supplied to the sub-assembly (6), via the additional valve arrangement (35), is cooled by a cooler (40) located upstream of the additional valve arrangement (35).

10. The electrohydraulic transmission controller according to claim 1, wherein the electrohydraulic transmission controller communicates with an internal combustion engine (2) and the vehicle drive train (1), which includes an output (4), and the sub-assembly (6) that is supplied with the cooling oil volume flow by way of the additional valve arrangement (35), the sub-assembly (6) has a frictionally engaged switching element (61, 62, 63, 64, 65, 66) that is acted on by the cooling oil volume flow.

11. The electrohydraulic transmission controller according to claim 10, wherein the internal combustion engine (2) functionally connects with the output (4) via the frictionally engaged switching element (61, 62, 63, 64, 65, 66).

12. The vehicle drive train according to claim 11, wherein the frictionally engaged switching element (62) is arranged between a hydrodynamic torque converter (8) and a transmission input.

13. The electrohydraulic transmission controller according to claim 10, wherein an electrical engine (5) is arranged between the internal combustion engine (2) and a transmission input of the transmission device (3).

14. The vehicle drive train according to claim 13, wherein the frictionally engaged switching element (61, 62, 63, 64, 65, 66) is one of provided between the internal combustion engine (2) and the electric engine (5), or between the electric engine (5) and the output (4).

15. A transmission (3) of a vehicle drive train (1) in combination with an electrohydraulic transmission controller (7) comprising several electrically actuatable pressure control valves (9 to 16), a plurality of valve arrangements (17 to 34), each of which are controlled by a hydraulic pre-control pressure depending the activation of the pressure control valves (9 to 16), a plurality of switching elements (A, B, C, D, E) of a transmission device (3) are actuated by a control pressure for engaging an operating state of the transmission device (3), an additional pressure control valve (9) adjusts another pre-control pressure (p_VS_9) of an additional valve arrangement (35) such that, downstream of the additional valve arrangement (35), a sub-assembly (6) of a motor vehicle drive train (1) is acted on by a cooling oil volume flow that is subject to the other pre-control pressure (p_VS_9) of the additional valve arrangement (35) and an operating state of the additional valve arrangement (35) corresponding to it, a transmission housing (42), and the sub-assembly (6) includes a frictionally engaged switching element (61, 62, 63, 64, 65, 66), which is located one of inside and outside the transmission housing (42) and is acted on by the cooling oil volume flow.

16. The transmission (3) of the vehicle drive train (1) in combination with the electrohydraulic transmission controller (7) according to claim 15, wherein the frictionally engaged switching element (61, 64, 66) is a starting element.

17. The transmission (3) of the vehicle drive train (1) in combination with the electrohydraulic transmission controller (7) according to claim 15, wherein the frictionally engaged switching element (61, 64) is a separating clutch for producing a desire transmission ratio.

18. The transmission (3) of the vehicle drive train (1) in combination with the electrohydraulic transmission controller (7) according to claim 15, wherein the transmission (3) is a twin-clutch transmission and the frictionally engaged switching element is a switching element that shuts off and on a power path of the twin-clutch transmission.

19. The transmission (3) of the vehicle drive train (1) in combination with the electrohydraulic transmission controller (7) according to claim 15, the frictionally engaged switching element (62) is arranged in a power path between a hydrodynamic torque converter (8) and a transmission output.

20. The transmission (3) of the vehicle drive train (1) in combination with the electrohydraulic transmission controller (7) according to claim 15, wherein the frictionally engaged switching element bridges a hydrodynamic torque converter.

21. The transmission (3) of the vehicle drive train (1) in combination with the electrohydraulic transmission controller (7) according to claim 15, wherein an electric engine (5) is arranged inside the transmission housing (42) for producing a torque which is conducted into a power path of the transmission device (3).

22. The transmission (3) of the vehicle drive train (1) in combination with the electrohydraulic transmission controller (7) according to claim 21, wherein a transmission input shaft (44) and the electric engine (5) functionally communicate via the frictionally engaged switching element (66).

23. The transmission (3) of the vehicle drive train (1) in combination with the electrohydraulic transmission controller (7) according to claim 21, wherein a transmission output shaft (43) and the electric engine (5) functionally communicate via the frictionally engaged switching element (61).

* * * * *